Patented June 26, 1923.

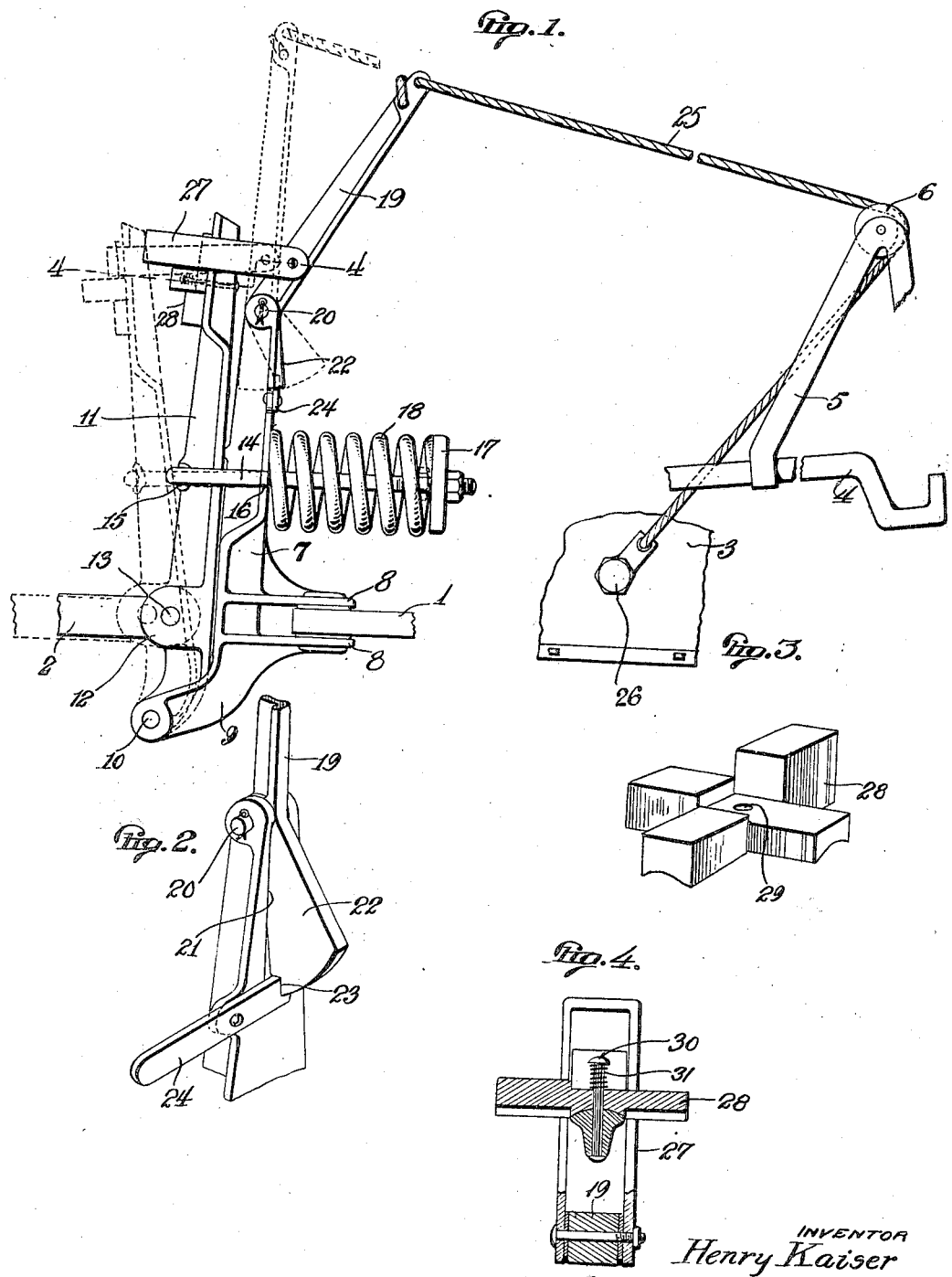

1,460,347

UNITED STATES PATENT OFFICE.

HENRY KAISER, OF NEW HOLSTEIN, WISCONSIN, ASSIGNOR TO THE FARM SPECIALTY MFGR. CO., OF NEW HOLSTEIN, WISCONSIN, A CORPORATION OF WISCONSIN.

COUPLING APPARATUS FOR TRACTORS.

Application filed February 2, 1920. Serial No. 355,561.

*To all whom it may concern:*

Be it known that HENRY KAISER, a citizen of the United States, residing at New Holstein, in the county of Calumet and State of Wisconsin, has invented certain new and useful Improvements in Coupling Apparatus for Tractors, of which the following is a specification.

This invention relates to draft appliances and more particularly to a coupling device for connecting a tractor and a plow. The primary object of the device is to provide a coupling means which will automatically operate to relieve the strain and jolt which occurs when the plow strikes an obstruction in the ground.

The invention further aims to provide a draft appliance of this character interposed between the tractor and the plow and connecting the same and associated with a part of the clutch mechanism of the tractor so that the device will automatically operate to release the clutch when the plow strikes an obstruction in the ground thereby causing the tractor and plow to come to a stop.

The invention further aims to provide a draft appliance which will include an adjusting device so that a greater or less power on the appliance is necessary to cause it to operate, the adjusting means being mounted so as to be conveniently reached by the operator and permit him to make several different adjustments.

A further object of the invention is to provide an implement of this character which will be simple in construction, durable, and well adapted to withstand the rough usages to which devices of this character are ordinarily subjected.

In the drawings;—

Fig. 1 is a side elevation of the implement showing fragmentary portions of the clutch mechanism and differential case of the tractor and their relative connections with the device.

Fig. 2 is a fragmentary perspective view of a portion of the lever locking mechanism employed.

Fig. 3 is a perspective view of the device for producing the variable adjustment.

Fig. 4 is a cross section taken substantially on the line 4—4 of Fig. 1.

The following specification sets forth a description of the device showing an improvement over my Letters Patent No. 1,305,651, patented June 3, 1919, and the present apparatus is designed primarily for the purpose of connecting modern tractors with gang plows and accomplishing a purpose not possible with the device described in the above mentioned patent.

Referring particularly to the drawings, the draw bar 1 of the tractor is in longitudinal alignment with the draft bar 2 of the gang plow. For the purposes of this illustration it is deemed merely necessary to show the draft bar and portion of the tractor as illustrated in Fig. 1. A portion of the differential case 3 is shown adjacent the clutch pedal 4 and the latter carries a bracket 5 upon which is mounted a grooved pulley 6, the purpose of which will presently appear.

A main lever 7 is provided with parallel ears 8 which are connected by a coupling pin with the draw bar 1 of the tractor. An elbow 9 is provided at the lower end of the main lever 7 and the terminal of the elbow portion 9 is projected rearwardly and is connected by a pin 10 with a swinging arm 11 which normally lies approximately parallel with the main lever 7 as shown in Fig. 1. The swinging lever 11 is provided, at a point in transverse alignment with the ears 8, with an enlarged portion 12 which forms an ear through which a pivot pin 13 is extended. The draft bar 2 of the plow is connected to this pin 13 so that the two draft bars are moveable away from each other by virtue of the pivoted levers 7 and 11.

A clevis 14 comprising a substantially U shaped member embraces both of the levers 7 and 11 and has one end engaged with the lever 11 as indicated at 15. The parallel portion of the clevis extending through openings 16 in the lever 7 and washers 17 are held in position on the ends of the clevis to be engaged by expansion spring 18 which are interposed between the washers and the adjacent surface of the lever 7. The action of the spring normally tends to draw the two levers 7 and 11 toward each other so that the tendency of the plow to resist the tug of the tractor will be relieved by the spring when the plow strikes an obstruction in the ground.

Pivotally mounted upon the terminal of the main lever 7 is a moveable extension arm 19 pivoted on a pivot pin 20 as shown to advantage in the detailed view, Fig. 2. The upper end of the lever 7 is bifurcated to form the slot 21 through which is moveable a plate 22 carried by the extension arm 19. This plate 22 is provided with a notch 23 which is adapted to receive a locking latch 24 for the purpose of locking the plate in the position shown in Fig. 2 as distinguished from the position shown in full lines in Fig. 1. The latter is a normal position of the device when in use, and it will be noted that the terminal of the extension arm 19 is connected by a cable 25, which passes over the pulley 6 and is rigidly fixed as indicated at 26 to a point on the differential case 3 of the tractor. The extension arm 19 is normally disposed at an angle with respect to the main lever 7 and near its pivot point, the extension arm is provided with a yoke 27 which embraces the end of the swinging lever 11 and extends considerably beyond the same when the parts are in normal position. The adjusting device, shown in detail in Figures 3 and 4, and operating in connection with the yoke 27, comprises a substantially cross shaped member 28 having a central opening 29 through which a pivot pin 30 is extended. The radiating arm of the cross shaped member 28 is composed of blocks of various thicknesses and inasmuch as a pin 30 is at the center of the member it will be obvious that either of the blocks may be disposed between the arms of the yoke member 27 as shown in Fig. 4. Pin 30 passes through lever 11 and adjacent the pin the lever has a curved surface or projection 11'. The head of the pivot member 30 is extended above the surface of the member 28 and a coil spring 31 is interposed between the block member and the head so that the block member will be normally urged toward the lever in order that surface 11' will enter selectively recesses 28' of the block member; the block member may be lifted above the swinging lever 11 whereby either of the blocks may be disposed in the position to be engaged by the yoke member 27. The curved surface of the part of the lever 11 with which the block member 28 engages, prevents casual or accidental displacement of the block member after it has been mounted in position and since the radiating arm or block portions of the member are of different thicknesses it will be obvious that the operator may adjust the device so that the swinging arm 11 will have a relatively long or short swinging movement.

In operation, the device will be connected to the tractor and plow as above described. As the plow is in operation, the lever 11 pulls between the bridge portion of the yoke 27 and when the plow blades encounter a stone or any other obstruction in the ground, which tends to retard the progress of the plow, the blocks operating in the yoke will strike the end thereof and cause a pull to be exerted on the extension lever 19 thereby moving the latter to the position shown by dotted lines in Fig. 1 and causing a pressure to be exerted on the cable 25, which, passing over the pulley 6, will operate the clutch lever and cause the clutch to be released thereby stopping the tractor. As the extension lever 19 moves to upright vertical position, the plate 22 is thrust outwardly through the slot 21 and the pivoted latch lever 24 swings on its pivot and engages the notch 23 thereby maintaining the extension lever 19 in locked position and holding the part in this position until such time as they are released. The member 28 will permit the swinging lever 11 to have four different lengths of movement and also it is possible to adjust the extension of the spring 18 so that the device can be made to operate when the plow encounters a slight obstruction if desired.

What is claimed is:—

1. A coupling apparatus having a first connecting means and a second connecting means, said means being attachable one to a propelling vehicle and the other to a trailing implement, said means being relatively movable, a resilient means to resist relative separating movement of said means but to permit relative movement of said means upon the implement striking an obstruction, means operable through said relative movement of said means to stop travel of said implement, a device extending from one of said connecting means to cooperate with the other connecting means to limit separating movement of the connecting means, and a block adjustably mounted on one of the connecting means having portions of different thicknesses for selective projection cooperating with said device to vary the extent of separation of said connecting means.

2. A draft appliance of the class described comprising, a main lever connected to the tractor, a swinging lever pivotally mounted on one end of the main lever and connected to the trailing implement, a yoke member embracing both of the said levers and provided at one end with an abutment, and a coil spring interposed between the abutment and the adjacent face of the said main lever whereby the said spring will act to normally maintain the said lever in parallel relation against the tendency of the said implement to draw the levers from the said main lever.

3. A coupling device of the class described, a main lever connected to the tractor, a lever pivotally connected to the main lever, resilient means embracing both of the said levers and normally maintaining them in parallel relation, the said main lever being provided with a pivotally mounted extension, means operable from the clutch of the tractor and connected to the said extension whereby the said clutch will be actuated on the said extension as swung on its pivot, and means connecting the said extension and the said swinging lever to cause movement to be imparted to the said extension when the swinging lever is swung on the main lever by the resistance offered by the trailing implement when the tractor is in motion.

4. A coupling device of the class described comprising pivoted levers connected to the tractor and trailing implement and adapted to swing toward and away from each other, a yoke carried by one of the levers and engageable with the other lever to limit the movement of the said levers with respect to each other, and adjustable means mounted on the swinging lever and adapted to be associated with the said yoke for varying the adjustment whereby the swinging movement of the levers may be governed.

5. A coupling device comprising a pair of pivotally connected levers, one of the levers having a yoke pivotally connected thereto and embracing the end of the other lever, a cross member pivotally mounted on the said other lever and including radiating blocks of different thicknesses adapted to be received between the arms of the yoke whereby movement of the swinging lever will be limited according to the thickness of the block disposed between the arms of the said yoke.

In testimony whereof I affix my signature.

HENRY KAISER.